US011329986B2

(12) United States Patent
Leahy et al.

(10) Patent No.: US 11,329,986 B2
(45) Date of Patent: May 10, 2022

(54) SYSTEM FOR CENTRALIZED CERTIFICATION OF ELECTRONIC COMMUNICATIONS

(71) Applicant: Digital Minion LLC, Los Altos, CA (US)

(72) Inventors: Austin Leahy, Los Altos, CA (US); Jeremy Nelson, Los Altos, CA (US)

(73) Assignee: Digital Minion LLC, Los Altos, CA (US)

( * ) Notice: Subject to any disclaimer, the term of this patent is extended or adjusted under 35 U.S.C. 154(b) by 191 days.

(21) Appl. No.: 16/705,039

(22) Filed: Dec. 5, 2019

(65) Prior Publication Data
US 2020/0186525 A1 Jun. 11, 2020

Related U.S. Application Data

(60) Provisional application No. 62/775,747, filed on Dec. 5, 2018.

(51) Int. Cl.
G06F 7/04 (2006.01)
G06F 15/16 (2006.01)
G06F 17/30 (2006.01)
H04L 29/06 (2006.01)

(52) U.S. Cl.
CPC ........ H04L 63/0884 (2013.01); H04L 63/126 (2013.01)

(58) Field of Classification Search
CPC ... H04L 63/0884; H04L 63/126; H04L 63/08; G06F 21/606; G06F 21/44; G06F 21/31
See application file for complete search history.

(56) References Cited

U.S. PATENT DOCUMENTS

| 2014/0215571 | A1* | 7/2014 | Shuster | H04L 63/126 726/4 |
| 2015/0121075 | A1* | 4/2015 | Harjanto | H04L 63/126 713/170 |
| 2016/0315969 | A1* | 10/2016 | Goldstein | H04L 51/04 |
| 2018/0295153 | A1* | 10/2018 | Eisen | H04L 63/1483 |

* cited by examiner

Primary Examiner — Amie C. Lin
(74) Attorney, Agent, or Firm — Smyrski Law Group, A P.C.

(57) ABSTRACT

A system for processing communications is provided. The system includes a trusted receiver device configured to receive a communication directed to a known trusted receiver address, a message handler device configured to interface with the trusted receiver device and create a thumbprint of select portions of the communication, an analysis device configured to analyze the communication based on the communication and the thumbprint, and a metadata storage device connected to the trusted receiver device configured to receive and store metadata associated with each verified communication received. The communication comprises information identifiable to the system in a particular field of the communication intended to be invisible to unauthorized recipients, and the communication is verified and transmitted to the sender and intended recipient. Any entity can verify a communication received by the system. Any communication transmission protocol, service, or platform may be employed and the recipient does not require any specialized software.

19 Claims, 4 Drawing Sheets

SYSTEM FOR CENTRALIZED CERTIFICATION OF ELECTRONIC COMMUNICATIONS

The present application claims priority based on U.S. Provisional Patent Application Ser. No. 62/775,747, entitled "System for Centralized Certification of Electronic Communications," inventor Austin Leahy, filed Dec. 5, 2018, the entirety of which is incorporated herein by reference.

BACKGROUND

I. Field

The present invention relates generally to the field of authentication and certification of communications, and more specifically to systems that authenticate or certify electronic communications transmitted between entities, such as emails.

II. Background

In the modern world, electronic communications, such as emails, are subject to hacking, wherein either the communication is intercepted and not delivered to the recipient, or an electronic communication is falsely transmitted as being from a different sender.

Different authentication systems have been employed to combat such hacking. One system is the use of keys or tokens, including use of a "public" key, which can be given to anyone, and a "private" key, which is retained by the sender. The sender encrypts the transmission using the key, token, or other item, transmits the encrypted communication over the internet, and the recipient decrypts the transmission using decryption processing and the necessary keys, tokens, or items. Various versions or flavors of this type of operation exist, including but not limited to certificate distribution, PM (RSA algorithm) processing, PGP, and digital signatures.

In these types of arrangements, the sender and recipient mail clients are configured to use encryption entities, such as encryption keys. The sender encrypts the message using, for example, the sender private key, and the recipient decrypts the message using the sender's public key and may use the recipient's private key to decrypt a second layer. A PGP client may be employed with PKI, where the sender and recipient exchange public keys, and the sender encrypts the message with the sender private key and the recipient public key, and the recipient uses the PGP application to decrypt both layers of encryption.

An issue with this type of authentication is that both parties need to have the applicable software available and operational. In the current environment, where users are employing various electronic communication solutions on different platforms (online/cloud services such as Gmail, Yahoo Mail, etc., solutions or client products such as Microsoft Outlook, Apple Mail, etc.) on mobile devices, tablets, personal computers, and even televisions and other appliances, successfully deploying such authentication solutions (certificate verification, PKI software, etc.) is challenging. Most email applications have not adopted encryption technology, and a turnkey solution is in most cases unavailable. As a result, such technology must be added by the user, a complex task for many individuals that requires updating upon encountering new versions, different underlying email applications, and so forth. Certain cloud-based email services simply do not offer encryption or decryption capabilities for such communications.

In such a transmission scenario, a user receiving a message on a device that does not have the proper setup, in terms of both hardware and current and properly implemented software, is placed in the unenviable position of having a message that may be highly important with no way to understand the communication. Such limitations are highly undesirable.

It would therefore be beneficial to offer a system employable across multiple platforms that overcomes issues with previously available communication authentication designs.

SUMMARY

According to one embodiment, there is provided a system for processing communications, comprising a trusted receiver device configured to receive a communication directed to a known trusted receiver address, a message handler device configured to interface with the trusted receiver device and create a thumbprint of select portions of the communication, an analysis device configured to analyze the communication based on the communication and the thumbprint, and a metadata storage device connected to the trusted receiver device configured to receive and store metadata associated with each verified communication received. The communication comprises information identifiable to the system in a particular field of the communication to be invisible to unauthorized recipients, and the communication is verified and transmitted to the sender and intended recipient. In one aspect, any entity can verify a communication received by the system. Any communication transmission protocol, service, or platform may be employed to transmit the communication and the recipient does not require any specialized software to view the communication.

According to another embodiment, there is provided a method for processing communications, comprising receiving at a system an electronic communication comprising a message and information identifying a sender in a predetermined field in the electronic communication, processing the electronic communication by selecting components of the electronic communication, thereby establishing a communication thumbprint, analyzing the communication based on the communication thumbprint, wherein said analyzing comprises determining authenticity of the communication, and transmitting the message to the sender and a recipient. The information identifying a sender in a predetermined field is invisible to unauthorized recipients, and the communication is verified and transmitted to the sender and intended recipient.

According to a further embodiment, there is provided a system comprising a trusted receiver device configured to receive a communication directed to a known trusted receiver address, a message handler device configured to interface with the trusted receiver device and create a thumbprint of select portions of the communication, and an analysis device configured to analyze the communication based on the communication and the thumbprint. The communication comprises information identifiable to the system in a particular field of the communication intended to be invisible to unauthorized recipients, and the system is configured to verify and transmit the communication to the sender and intended recipient.

Various aspects and features of the disclosure are described in further detail below.

DETAILED DESCRIPTION

The present design provides a centralized system for transmitting and receiving sensitive communications that improves on both the trust of the sender and receiver in the content of the communication and the ability for the communication to reach its desired destination. The present design obviates the need to install, update, or in any way employ specialized software, such as encryption software, by using a central trusted source to receive communications and transmit the communications to appropriate parties, while at the same time providing the sender with verification of the transmission.

In general, the present system places identifiable information in a particular field of an email, and the sender transmits the email with the identifiable information to the central processor or server arrangement. In this arrangement, the central system verifies the sender, transmits the original email back to the sender (or some verification indication), and transmits the message to the intended recipient. The intended recipient knows, by virtue of transmission from the central processor or server arrangement, that the email is legitimate and from the sender.

Figure 1:
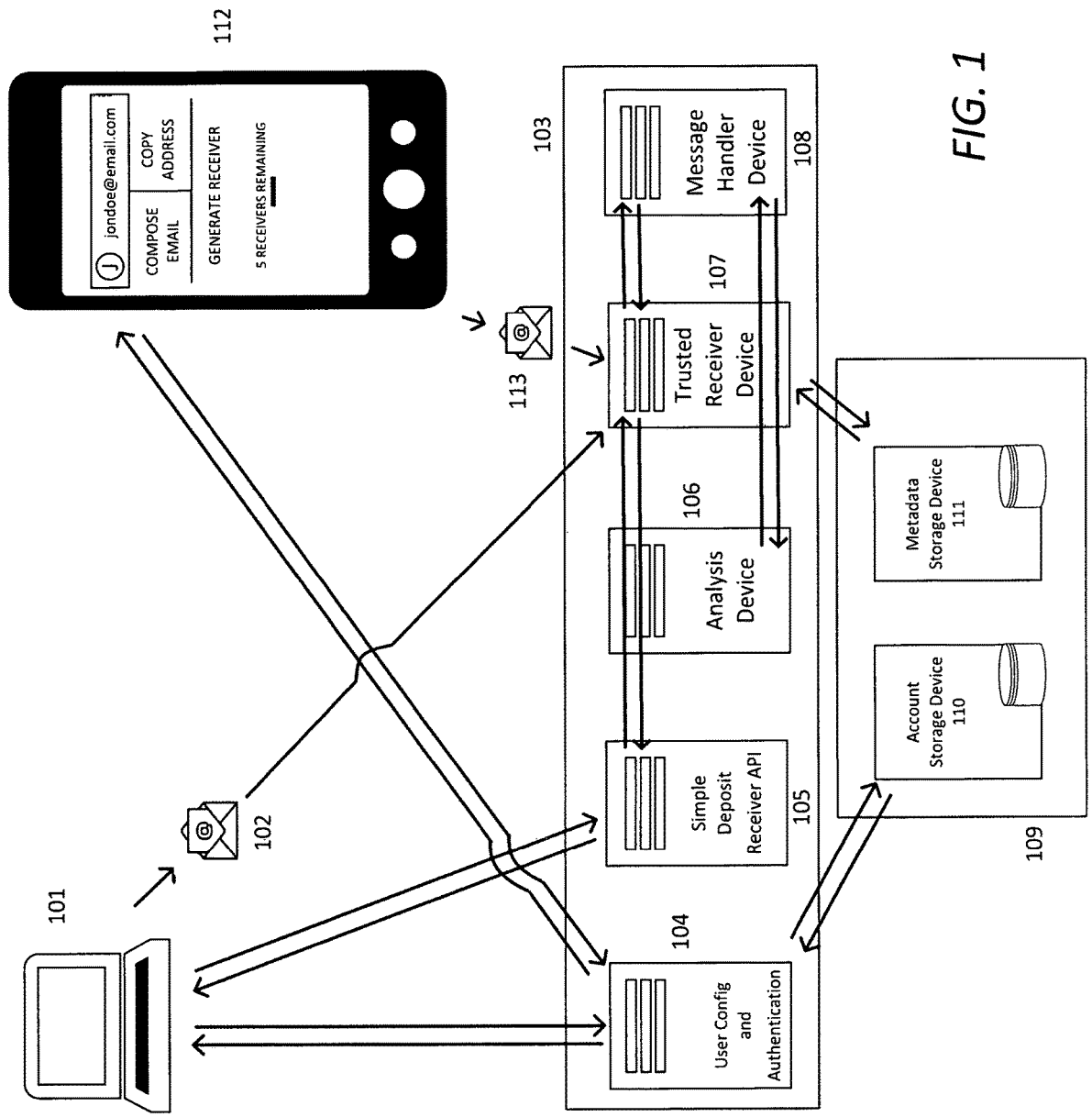
FIG. 1 illustrates the present system.

FIG. 1 illustrates the present system. Transmitter or sender device 101 prepares the electronic communication 102 and transmits the electronic communication to server arrangement 103, which includes user configuration and authentication appliance element 104, simple deposit receiver element 105, analysis appliance element 106, trusted receiver appliance element 107, and message handler appliance element 108. Certain elements of server arrangement 103 interface with storage device arrangement 109, including account storage device 110 and metadata storage device 111. As shown, trusted receiver appliance element 107 receives the email, and interfaces with message handler appliance element 108, which in turn interfaces with analysis appliance element 106. User configuration and authentication appliance element 104 receives information from and transmits information to sender device 101. The storage device arrangement interfaces with trusted receiver appliance element 107 and user configuration and authentication appliance element 104. Once processed, the email is transmitted from user configuration and authentication device 104 to receiver device 112, which in turn transmits a received indication to user configuration and authentication appliance element 104. The receiver device 112 may also transmit an email 113 to trusted receiver device 107 in this configuration.

Figure 2:
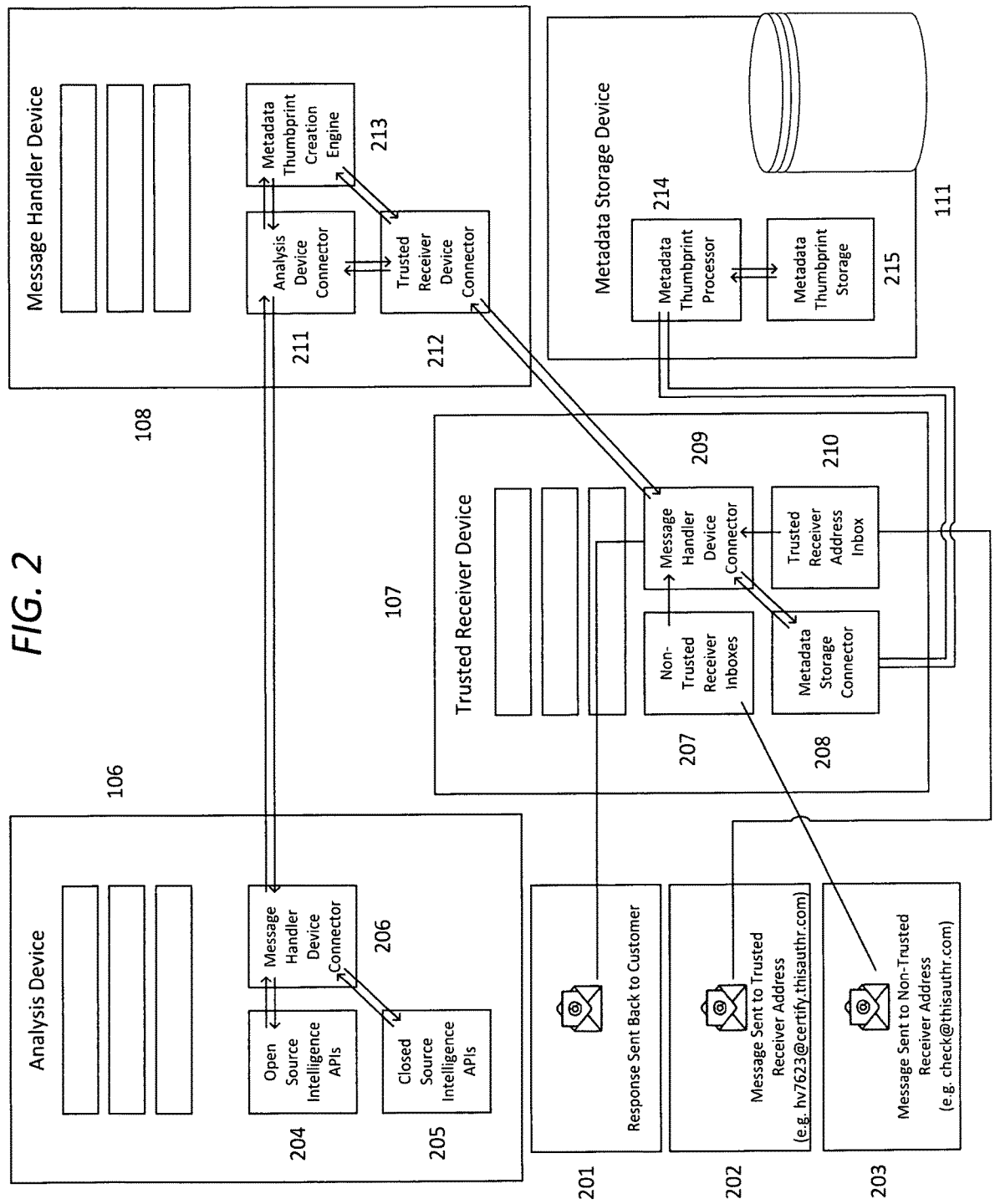
FIG. 2 shows certain components and subcomponents of the system.

Further, user configuration and authentication appliance element 104 interfaces with account storage device 110 while trusted receiver device 107 interfaces with metadata storage device 111. FIG. 2 illustrates selected components from FIG. 1, showing operation of analysis appliance element 106, trusted receiver appliance element 107, message handler appliance element 108, and metadata storage device 111. From FIG. 2, a message may be sent to a non-trusted receiver address at point 203, wherein the message is received at non-trusted receiver inbox or inboxes 207. A message sent to a trusted receiver address, shown as point 202, goes to trusted receiver address inbox 210. A number of connector appliance elements are provided, including two in the trusted receiver appliance element 107, metadata storage connector 208 and message handler device connector 209, connecting to metadata thumbprint processor 214 and trusted receiver device connector 212, respectively. Also provided is analysis device connector 211 which connects to message handler device connector 206 in analysis appliance element 106. These hardware connectors cause the interface between the various elements and the transmission of communications.

In metadata storage device 111, metadata thumbprint processor 214 processes metadata associated with a received message, including sender information and user information and any other metadata associated with a transmitted message and provides such information to metadata thumbprint storage appliance element 215. In message handler appliance element 108, a metadata thumbprint creation engine is provided that interfaces with both the analysis device connector 211 and trusted receiver device connector 212 and determines or creates a thumbprint of each communication based on the metadata provided in the transmission. Metadata may be collected or received and analyzed in different ways, but as long as all messages are consistently evaluated and thumbprints developed using a consistent rubric. Analysis appliance element 106 further includes intelligence APIs, which may be open source at point 204 or closed source 205. If, for example, no open source APIs are employed, open source intelligence APIs 204 may be omitted.

System users also have the option of downloading a plugin for their email client, wherein the system provides the customer with a "simple deposit" button in a designated window as well as the "sent items" folder of his or her email client. When the user has drafted and is ready to send an email, the system provides the user with the option of selecting the "simple deposit" option to invoke the simple deposit receiver API 105. The simple deposit receiver API 105 generates a trusted receiver address and deposits the email to the trusted receiver device without requiring the trusted receiver address to be used in the BCC field as discussed elsewhere herein. Using the "simple deposit" button on a draft email before the email is ready to send causes the system to deposit whatever information is currently in the "draft" state. Any changes made to a draft email after using the simple deposit receiver API 105 is not deposited to the system unless the user selects the "simple deposit" option after making changes. Each time the user selects the simple deposit button, the system consumes one of his available trusted receiver addresses. The customer may also use the simple deposit receiver API 105 for previously transmitted emails by selecting the email in his "Sent" folder and selecting the "simple deposit" option. The system employs the simple deposit receiver API 105, which interacts with the user's "Sent" folder and provides the same end result as if the user generated a trusted receiver address and included the trusted receiver address in the BCC field when sending an email.

With respect to FIG. 1, user configuration and authentication appliance element 104 authenticates the sender and may provide user configuration functionality, such as user names, passwords, and may distribute information for inclusion in transmissions to verify the identity of the user/sender. Message handler appliance element 108 receives the message information and creates a thumbprint of the message based on message metadata, and the thumbprint and information are transmitted to analysis appliance element 106 for processing. Analysis appliance element 106 employs APIs to analyze the communication and thumbprint and may match or otherwise correlate thumbprints between a received message from sender X and the history of messages from sender X. For example, if sender X has transmitted messages using Microsoft Outlook and Gmail from three devices, and the current message from sender X is sent from Mac Mail on an unrecognized hardware device, the system may flag the message as suspicious and may either pass this information for further investigation or follow up or may take action in the subsequent transmission of the sent message, such as holding the message until sender X answers security questions.

Figure 3:
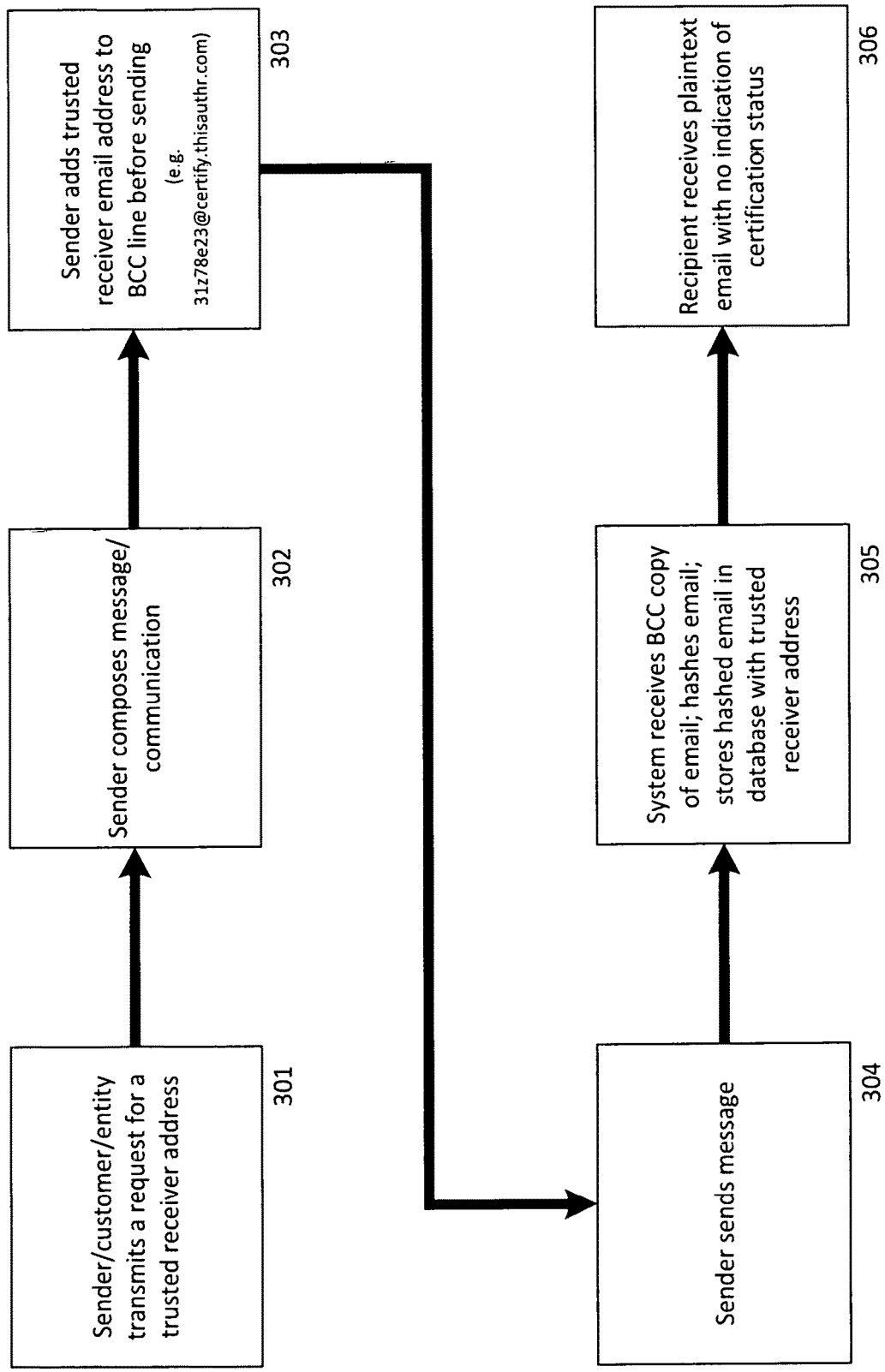
FIG. 3 illustrates general flow of processing using the hardware represented in FIG. 1.

FIG. 3 illustrates general flow of processing using the hardware represented in FIG. 1. Only the sender is required to have an account on the system. The recipient does not need an account, and the system is email client agnostic. The sender may send certified communications, such as certified emails, to anyone irrespective of sender or recipient email client or configuration, or the identity of the recipient. From point 301, the sender uses the system to request a trusted receiver email address, and the system provides such an address. At point 302, the sender composes the message, while at point 303 the sender adds a trusted receiver address to the message, preferably in a hidden field, such as a BCC (blind carbon copy) field of the email prior to sending.

BCC fields in email transmission include one or more addresses of persons whom the sender wishes to transmit to but does not wish other recipients to receive or view. When the message including one or more BCC recipients, such as BCC recipient K, is transmitted, the other recipients do not see that recipient K received the message as well and see nothing about recipient K.

In certain arrangements, such as enterprise situations, BCC information and/or metadata may be available to system administrators. However, under normal circumstances, once transmitted, a recipient cannot retrieve BCC information from the transmitted message, including from message metadata. In this arrangement, the sender transmits a BCC version of the communication to a predetermined address known to both the sender and the system, such as 31z78e23@certify.thisauthr.com, an address recognized by the system to represent emails or communications from this sender.

At point 304, the sender transmits the communication to the server arrangement as shown in FIGS. 1 and 2. The system at point 305 receives the BCC copy of the transmission and may hash or translate the transmission into hexadecimal values and may store the hashed email. The transmission is authentic in this example, and thus the recipient is considered to be a trusted recipient and may be added to the database for subsequent thumbprint processing. The system thus at point 305 stores the hashed communication according to the trusted recipient address. The system then transmits the message to the recipient in plaintext with no indication of certification status at point 306.

Figure 4:
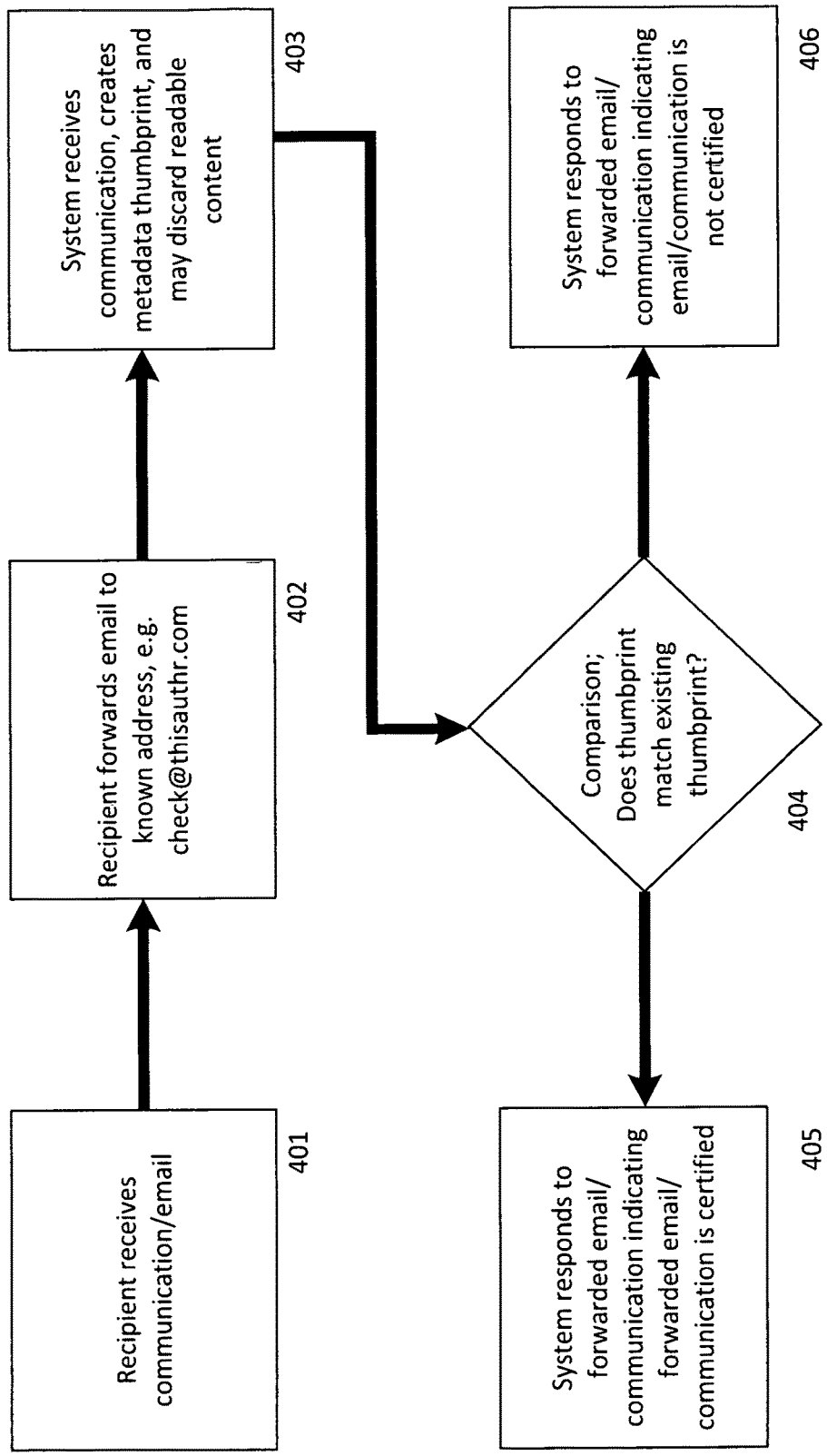
FIG. 4 represents processing of the communication, including system evaluation of email certification status.

FIG. 4 represents system evaluation of email certification status. Anyone may check the certification status of any email, irrespective of the sender or recipient client or configuration or the status of the sender or recipient as users of or subscribers to the system. At point 401, the recipient receives the transmission, such as an email. At point 402, the recipient forwards the email to a checking or evaluation address associated with the system, such as check@thisauthr.com. This provides verification that the email was received by the recipient. At point 403, the system receives the communication from the recipient, creates a metadata thumbprint of the message received and may discard the readable content.

At point 404, the system compares the thumbprint to existing certified thumbprints and evaluates whether the thumbprint matches an existing certified thumbprint. If not, at point 406, the system responds to the forwarded email from the recipient indicating the email is not certified. If the thumbprint does match, point 405 indicates the system responds to the forwarded email from the recipient indicating the email is certified.

Thus according to the present design, individuals or entities designated as "Customers" are assumed to have accounts with the system. Having an account authorizes a customer to create a single use email inbox, in the form of a trusted receiver address (e.g. hv7623@certify.thisauthr.com)). Once the system creates the trusted receiver address, the customer can send one transmission, such as an email, to that address using the BCC field of an email. The trusted receiver address may become invalid and need to be re-created if a trusted receiver address is used in any other text field in an email, including the body. Each time a customer wants to deposit an email, he or she creates a trusted receiver address with the system. Inboxes for trusted receiver addresses and other system email addresses typically reside on the system. Once the system receives a communication, the system provides the communication to the message handler appliance element 108 for processing. The message handler appliance element 108 captures the sender email address and the timestamp when the email was sent. The message handler appliance element 108 may remove all blank or white space from the body of the transmitted message and may remove any HTML code and may, in one embodiment, convert the remaining body text to uppercase letters.

The system then hashes, or converts to hexadecimal form, the uppercase letters of the body that remain. The message handler appliance element 108 provides any URLs present in the email in a single long URL in one embodiment, and message handler appliance element 108 creates a hash from that single URL. The message handler appliance element 108 may then discard the original body text and URLs leaving only the sender, email address, sent timestamp, email body hash, and URL hash, if one exists. In one embodiment, these items collectively make up the metadata thumbprint. The message handler appliance element 108 sends the metadata thumbprint to the trusted receiver appliance element 107, which sends the metadata it to the metadata storage device 111. The metadata storage device indexes the thumbprint, such as by sender name, for later comparison to other thumbprints for other transmissions.

If another customer receives an electronic communication and wishes to check if the communication is certified, that customer may forward the email to a special email address (e.g. check@thisauthr.com), an inbox that resides on the trusted receiver appliance element 107. The trusted receiver appliance element 107 forwards the communication to the message handler appliance element 108. The message handler appliance element 108 creates a metadata thumbprint of the forwarded email in a similar manner to the metadata thumbprint created when emails are deposited, typically including the same fields or information. The message handler appliance element 108 extracts the original email is extracted from "forwarded message" section of the email, and the sender and timestamp are recorded. The message handler appliance element 108 strips all white space and HTML from the body of the forwarded email and the remaining text is converted to uppercase letters in one embodiment. The uppercase body is then hashed at the message handler appliance element 108 along with any URLs. The message handler appliance element 108 sends the following items to trusted receiver appliance element 107: sender email address, sent timestamp, email body hash, and URL hash, if any. The trusted receiver hardware element 107 then uses thumbprint data stored on metadata storage device 111 to compare the thumbprint of the forwarded email to the existing thumbprints previously deposited by the trusted receiver appliance element 107. If the forwarded email thumbprint matches an existing entry, the trusted receiver appliance element 107 then responds to the customer to let him or her know that the forwarded email was previously deposited, thereby certifying that the sender address of the forwarded email is authentic and the message content of the forwarded email, including any URLs, has not been tampered with in any way. If the forwarded email thumbprint does not match any existing entry in the metadata storage device 111, the message handler appliance element 108 sends the forwarded email to the analysis appliance element 106.

The analysis appliance element 106 then determines whether the email is considered malicious based on intelligence regarding the content of the email, sender, any URLs present, and/or any attachments and their content. This determination is then transmitted form the analysis appliance element 106 to message handler 108, which puts the determination into a further communication, such as an email, potentially with other information, and sends the email to the entity that forwarded the email to the specially-crafted email address. In the email, the entity is informed that the forwarded email was not previously deposited, and the entity should exercise caution in trusting its content, the determination as to whether the email may be malicious, and instructions for passing the email to a human for additional analysis, if desired.

Thus the system tracks customers and subscriptions, allows users or customers to verify themselves and to place requests for one-time-use email inboxes, and provides a verified customer with the address of the one-time-use email inbox. The system provisions one-time-use email inboxes and keeps track of the entity associated with each inbox, and accepts email having a selected field, such as the BCC header including an email address for a one-time-use email inbox. The "from" header should include a registered email of a verified customer, thus verifying that the one-time-use inbox is provisioned by the entity who that requested that one-time use inbox.

The system collects email delivered to the one-time-use inbox and processes the received communication by, in one embodiment, rendering the email to plain text, removing all semantic information (e.g. html), all non-alphabetic characters and all whitespace. The system retains the hash of this plain text rendering, and the communication may be rendered to a list of hyperlinks (URLs) in plain text, and the system may retain a hash of these hyperlinks. The sender's email may be retained, as well as the time the email was received. The system thus acts as a depository and records digests or summaries provided. When a digest or summary is available, the system determines whether the digest or summary has been previously provided. In the present system, the original email can be delivered as a forward, a reply, or as an attachment. The system determines how the original email was delivered, and extracts the original email by removing all of the metadata surrounding this information (for example, forward, reply, attachments, etc.) The device processes the original email, and if the submitted email was properly deposited, the system sends an acknowledgement to the submitter that the email is a genuine deposited article. If the system determines the submitted email was not properly deposited, the system transmits an indication to the submitter that the email could not be verified as genuine.

In one instance, a customer may sign up for the service, providing credit card information, subscription selection, and other relevant selections with the system. The customer wishes to place on deposit an email they are transmitting. That customer may use any email transmission arrangement or service, in order to interface with the system to request the provisioning of a one-time-only email inbox from the device. Two factor authentication or other authentication techniques may be employed to verify that the customer is authentic, and that the use of the one-time-email address for the customer is authorized.

The customer may copy and paste the one-time-only email address provided by device into a particular field or area in the proposed communication, such as the BCC field of an email as an artifact used to exclusively communicate with the system. The sender transmits the email both to its intended target and the system. The system receives the email and determines that the one-time-only email inbox was provisioned by the transmitting entity, in that the "from" address is a registered email address for that user or customer for depositing emails. The system delivers the communication to the receiving device or email account specified, and the receiving device renders the communication to a digest, in one embodiment, and may record the digest with the central system.

A recipient of an email may wish to verify that an email has been deposited with the system. That recipient may "forward," "reply to," or attach the email and send the email to a known public email address. The system receives the email from the inquirer and may extract the original email, submitted by the inquirer as either a "forward", a "reply to", or an attachment. After recovering the original email, the system provides it to a digest and then queries the system as to whether the digest has been deposited. Depending on the answer, the system replies to the submitter that the email is verified genuine or not verified genuine.

The present system may also include further functionality, including blockchain functionality. The system may operate wherein the thumbprint of an item of deposit, such as a communication, email, etc., is registered in a semi-public distributed database. The system may control access, and specifically write access, to the database through encryption certificates. Read access may be uncontrolled. The decision on whether an item has been deposited can be made by those with read access to the database, who may not have write access to the database. The database is not specific to one type of hash, nor does the type of hash have to be publicly known; The system provides that any depositor may write or provide a hash that can be verified by any reader with the correct hash algorithm, and the system is thus hash independent. Hashes may be made public or kept private. Hashing algorithms provided may be forward or backward compatible.

Thus according to one embodiment of the present design, there is provided a system for processing communications, comprising a trusted receiver device configured to receive a communication directed to a known trusted receiver address, a message handler device configured to interface with the trusted receiver device and create a thumbprint of select portions of the communication, an analysis device configured to analyze the communication based on the communication and the thumbprint, and a metadata storage device connected to the trusted receiver device configured to receive and store metadata associated with each verified communication received. The communication comprises information identifiable to the system in a particular field of the communication intended to be invisible to unauthorized recipients, and the communication is verified and transmitted to the sender and intended recipient. In one aspect, any entity can verify a communication received by the system. Any communication transmission protocol, service, or platform may be employed to transmit the communication and the recipient does not require any specialized software to view the communication.

According to another embodiment, there is provided a method for processing communications, comprising receiving at a system an electronic communication comprising a message and information identifying a sender in a predetermined field in the electronic communication, processing the electronic communication by selecting components of the electronic communication, thereby establishing a communication thumbprint, analyzing the communication based on the communication thumbprint, wherein said analyzing comprises determining authenticity of the communication, and transmitting the message to the sender and a recipient. The information identifying a sender in a predetermined field is invisible to unauthorized recipients, and the communication is verified and transmitted to the sender and intended recipient.

According to a further embodiment, there is provided a system comprising a trusted receiver device configured to receive a communication directed to a known trusted receiver address, a message handler device configured to interface with the trusted receiver device and create a thumbprint of select portions of the communication, and an analysis device configured to analyze the communication based on the communication and the thumbprint. The communication comprises information identifiable to the system in a particular field of the communication intended to be invisible to unauthorized recipients, and the system is configured to verify and transmit the communication to the sender and intended recipient.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A system for processing communications, comprising:
    a trusted receiver device configured to receive a communication directed to a known trusted receiver address, wherein each known trusted receiver address is provided in a communication field intended to be invisible to unauthorized recipients, and each known trusted receiver address is known to the trusted receiver device;
    a message handler device configured to interface with the trusted receiver device and create a thumbprint of select portions of the communication;
    an analysis device configured to analyze the communication based on contents of the communication and the thumbprint and determine whether the communication is a verified communication or an unverified communication; and
    a metadata storage device connected to the trusted receiver device configured to receive and store metadata associated with each verified communication received;
    wherein the system transmits each verified communication to a sender and an intended recipient and refrains from transmitting each unverified communication to the intended recipient.

2. The system of claim 1, wherein any entity can verify the communication.

3. The system of claim 1, wherein any communication transmission protocol, service, or platform may be employed to transmit the communication and the intended recipient does not require any specialized software to view the communication.

4. The system of claim 1, wherein the analysis device comprises intelligence application program interfaces (APIs).

5. The system of claim 1, wherein the message handler device comprises a metadata thumbprint creation engine.

6. The system of claim 1, wherein the metadata storage device comprises a metadata thumbprint processor and a metadata thumbprint storage element.

7. The system of claim 1, wherein the trusted receiver device is configured to receive non-trusted receiver addressed communications at a non-trusted receiver inbox and receive trusted receiver addressed communications at a trusted receiver inbox.

8. A method for processing communications, comprising:
    receiving at a system a communication comprising a known trusted receiver address known to the system and identifying a sender in a predetermined field in the communication, wherein the known trusted receiver address in the predetermined field is not viewable by unauthorized recipients, and;
    processing the communication by selecting components of the communication, thereby establishing a communication thumbprint;
    analyzing the communication based on the communication thumbprint, wherein said analyzing comprises determining whether the communication is a verified communication or an unverified communication; and
    wherein each verified communication is transmitted to the sender and intended recipient and no unverified communication is transmitted to the intended recipient.

9. The method of claim 8, wherein any entity can verify the communication.

10. The method of claim 8, wherein any communication transmission protocol, service, or platform may be employed to transmit the communication and the intended recipient does not require any specialized software to view the communication.

11. The method of claim 8, wherein the analyzing employs intelligence application program interfaces (APIs).

12. The method of claim 8, wherein processing the electronic communication employs a metadata thumbprint creation engine.

13. The method of claim 8, further comprising:
    receiving non-trusted receiver addressed communications at a non-trusted receiver inbox; and
    receiving trusted receiver addressed communications at a trusted receiver inbox.

14. A system comprising:
- a trusted receiver device configured to receive a communication directed to a known trusted receiver address, wherein each known trusted receiver address is provided in a communication field intended to be non-viewable by unauthorized recipients, and each known trusted receiver address is known to the trusted receiver device;
- a message handler device configured to interface with the trusted receiver device and create a thumbprint of select portions of the communication; and
- an analysis device configured to analyze the communication based on the communication and the thumbprint and determine whether the communication is a verified communication or an unverified communication;
- wherein the system is configured to transmit each verified communication to a sender and an intended recipient and refrain from transmitting each unverified communication to the intended recipient.

15. The system of claim 14, wherein any entity can verify the communication.

16. The system of claim 14, wherein any communication transmission protocol, service, or platform may be employed to transmit the communication and the intended recipient does not require any specialized software to view the communication.

17. The system of claim 14, wherein the analysis device comprises intelligence application program interfaces (APIs).

18. The system of claim 14, wherein the message handler device comprises a metadata thumbprint creation engine.

19. The system of claim 14, wherein the trusted receiver device is configured to receive non-trusted receiver addressed communications at a non-trusted receiver inbox and receive trusted receiver addressed communications at a trusted receiver inbox.

* * * * *